US010223887B2

(12) United States Patent
Hong

(10) Patent No.: US 10,223,887 B2
(45) Date of Patent: Mar. 5, 2019

(54) ANTI-THEFT APPARATUS FOR SMART DEVICE

(71) Applicant: IDEASTUDIO CO., LTD., Seoul (KR)

(72) Inventor: Yong Seok Hong, Seoul (KR)

(73) Assignee: IDEASTUDIO CO., LTD., Seoul (KR)

(*) Notice: Subject to any disclaimer, the term of this patent is extended or adjusted under 35 U.S.C. 154(b) by 0 days.

(21) Appl. No.: 15/553,043

(22) PCT Filed: Oct. 19, 2016

(86) PCT No.: PCT/KR2016/011775
§ 371 (c)(1),
(2) Date: Aug. 23, 2017

(87) PCT Pub. No.: WO2017/086613
PCT Pub. Date: May 26, 2017

(65) Prior Publication Data
US 2018/0247506 A1  Aug. 30, 2018

(30) Foreign Application Priority Data
Nov. 17, 2015 (KR) .................. 10-2015-0161279

(51) Int. Cl.
G08B 13/22 (2006.01)
G08B 13/14 (2006.01)
(Continued)

(52) U.S. Cl.
CPC .......... G08B 13/22 (2013.01); G08B 13/14 (2013.01); G08B 13/24 (2013.01); G08B 15/00 (2013.01);
(Continued)

(58) Field of Classification Search
CPC ........ G08B 13/22; G08B 13/14; G08B 13/24; G08B 21/02; G08B 21/18; G08B 21/24;
(Continued)

(56) References Cited

U.S. PATENT DOCUMENTS

2016/0196485 A1* 7/2016 Patterson ........... G06K 19/0723
340/572.1

FOREIGN PATENT DOCUMENTS

JP  2005-099555 A   4/2005
JP  2013-257835 A   12/2013
(Continued)

OTHER PUBLICATIONS

International Search Report for PCT/KR2016/011775.

Primary Examiner — Leon Flores
(74) Attorney, Agent, or Firm — The PL Law Group, PLLC

(57) ABSTRACT

An anti-theft apparatus for a smart device includes a beacon transmitter configured to transmit beacon information to the smart device, the smart device including a theft management application which is synchronized with the beacon transmitter and is configured to receive the beacon information and transmit the received beacon information to a management server together with device information, and the management server configured to analyze the beacon information and the device information received from the theft management application to perform a theft management function. The anti-theft apparatus for a smart device can prevent the theft of a smart device which is installed or displayed in a specific space such as a shop, a show room, etc. by means of an anti-theft function using near field communication.

7 Claims, 5 Drawing Sheets

(51) Int. Cl.
*G08B 13/24* (2006.01)
*G08B 15/00* (2006.01)
*G08B 21/02* (2006.01)
*G08B 21/18* (2006.01)
*G08B 21/24* (2006.01)
*G08B 25/10* (2006.01)
*G08B 25/14* (2006.01)
*H04L 9/32* (2006.01)
*H04W 4/02* (2018.01)
*H04W 48/12* (2009.01)
*H04W 88/02* (2009.01)

(52) U.S. Cl.
CPC ............. *G08B 21/02* (2013.01); *G08B 21/18* (2013.01); *G08B 21/24* (2013.01); *G08B 25/10* (2013.01); *G08B 25/14* (2013.01); *H04L 9/32* (2013.01); *H04W 4/023* (2013.01); *H04W 48/12* (2013.01); *H04W 88/02* (2013.01)

(58) Field of Classification Search
CPC ........ G08B 25/10; G08B 25/14; G08B 15/00; H04L 9/32; H04W 48/12
See application file for complete search history.

(56) References Cited

FOREIGN PATENT DOCUMENTS

| | | |
|---|---|---|
| KR | 10-2013-0134946 A | 12/2013 |
| KR | 10-2015-0092849 A | 8/2015 |
| KR | 10-2015-0106257 A | 9/2015 |

\* cited by examiner

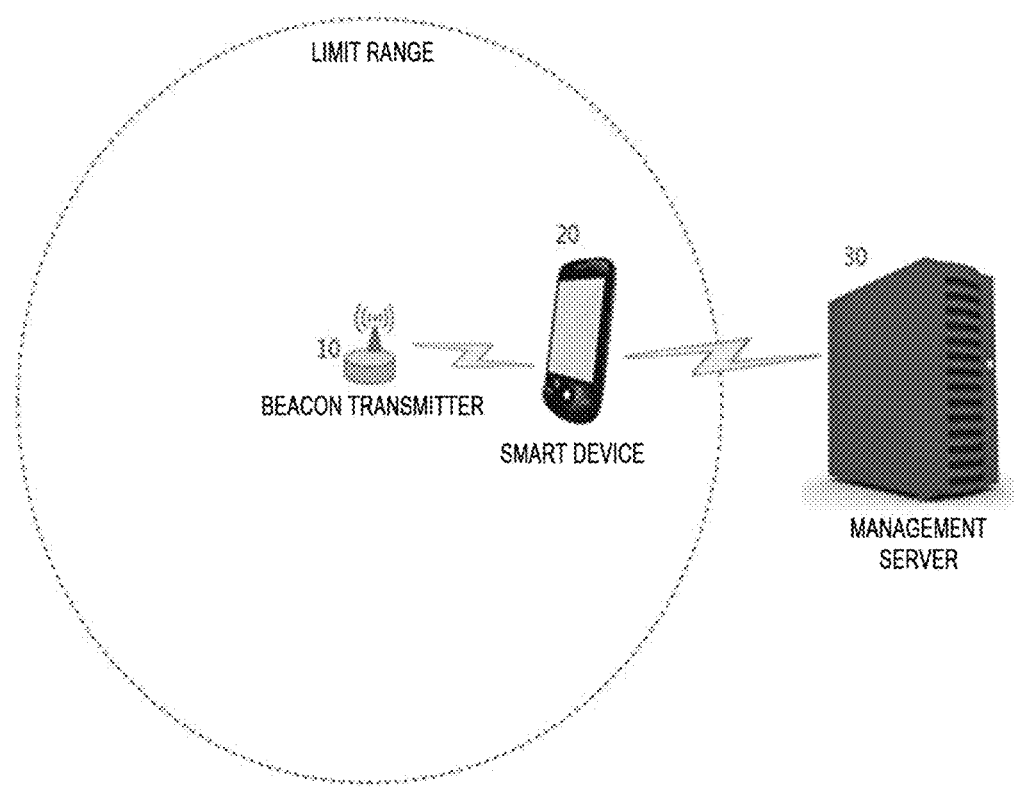

ANTI-THEFT APPARATUS FOR SMART DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/011775, filed on Oct. 19, 2016 which claims priority to the benefit of Korean Patent Application No. 10-2015-0161279 filed in the Korean Intellectual Property Office on Nov. 17, 2015, the entire contents of which are incorporated herein by reference.

TECHNICAL FIELD

The present invention relates to an anti-theft apparatus for a smart device, and more particularly, to an anti-theft apparatus for a smart device, which can prevent the theft of a smart device which is installed or displayed in a specific space such as a shop, a show room, etc. by means of an anti-theft function using near field communication.

BACKGROUND ART

With the development of Internet and communication technologies, there has been an explosive increase in the use smart devices, and various services utilizing smart devices are emerging.

As the smart devices become popular, the number of stores selling the smart devices is greatly increasing, and sample smart devices are displayed in stores to allow customers to experience a design and a performance of the smart devices in detail.

Further, in order to provide detailed information about art works displayed in a show room, etc. in which the art works are displayed, smart devices are installed in the show room to provide convenience for the customers.

However, because the smart devices are expensive, stealing of the smart devices is increasing. To prevent this, a lock device using a specially manufactured case and a wire is circulated in the market. However, there is a problem in that as wireless charging technologies emerge, customers who want to maximize the exhibition effect using the smart devices may not feel comfortable to the existing locking device.

Therefore, there is a need for a device capable of detecting and preventing a theft of smart devices without a physical configuration such as a lock device.

SUMMARY

In consideration of the above-mentioned circumstances, it is an object of the present invention to provide an anti-theft apparatus for a smart device capable of allowing an administrator to quickly perceive a theft of the smart device which is installed or displayed in a specific space such as a shop, a show room, etc. using near field communication between a beacon transmitter and the smart device to cope with the theft, and issuing a warning sound to a person who attempts to steal the smart device to prevent the theft of the smart device displayed or installed in a specific space.

In order to accomplish the above-described object, there is provided an anti-theft apparatus for a smart device, including: a beacon transmitter configured to transmit beacon information to the smart device; the smart device including a theft management application which is synchronized with the beacon transmitter and is configured to receive the beacon information and transmit the received beacon information to a management server together with device information; and the management server configured to analyze the beacon information and the device information received from the theft management application to perform a theft management function.

The beacon information may include identification information (ID) of the beacon transmitter and optionally an RSSI value; and the device information may be unique information for identifying the smart device, and in a case of a mobile phone, the device information may be a telephone number and in a case of other portable devices, the device information may be any one selected from a serial number of the devices, a Mac address, or an identification code (ID) newly assigned to the devices.

The management server may include: a beacon manager configured to register and manage a beacon transmitter installed in a specific space; an application manager configured to register and manage an anti-theft application installed in the smart device; an anti-theft manager configured to compare the beacon information and the device information received through the anti-theft application with information pre-stored in a database to identify the corresponding beacon transmitter and the smart device, and determine whether the corresponding smart device is positioned in a limit range to perform the theft management function; and the database configured to store and manage the beacon information of the installed beacon transmitter, the device information of the smart device in which the anti-theft application is installed, and administrator information.

The beacon transmitter may include a first beacon transmitter installed in an area where the smart device is installed or displayed, and at least one second beacon transmitter installed in an entrance and exit area for entering and exiting to an outside, and the anti-theft manager may determine that the smart device is positioned within coverage of the first beacon transmitter and therefore is in a safe state against a theft if the beacon information received from the smart device is information of the first beacon transmitter, determine that the smart device moves beyond the coverage of the first beacon transmitter if the beacon information is not received from the smart device, and determine that the smart device moves to the vicinity of an entrance door and therefore is highly likely to be stolen if the beacon information of the second beacon transmitter is received from the smart device.

The limit range may be set to be the coverage of the beacon transmitter or is arbitrarily set based on a relative distance between the beacon transmitter and the smart device within the coverage of the beacon transmitter, and the antitheft manager may transmit an alarm signal to the smart device if it is determined that the smart device is out of the limit range to be stolen, and transmit out-of-range information of the smart device to an administrator terminal.

If the limit range is arbitrarily set, the anti-theft manager may measure the relative distance based on the RSSI value of the beacon information and position information (GPS) of the smart device.

The limit range may be double-set by setting a range in which the smart phone is likely to be stolen by being separated from the beacon transmitter with a predetermined distance to be a primary limit range, and setting a range in which the smart phone is determined as being stolen by being separated far away from the beacon transmitter to be a secondary limit range, and an alarm signal may be transmitted to the smart device if the smart device is out of the primary limit range to operate an alarm of the smart device so as to arouse awareness about the theft to a holder, thereby guiding the holder to move in the primary limit range, and the out-of-range information of the smart device may be transmitted to a pre-registered administrator terminal together with the alarm signal to the smart device if the smart device is out of the secondary limit range to guide an administrator to take a measure to prevent the theft.

The anti-theft manager may detect an abnormal power-off or an attempt to terminate or delete the theft management application to perform theft management.

If there is an abnormal power-off attempt, the theft management application may be set to block a power-off function in a state in which the anti-theft application is executed when a power-off button is clicked, and when an attempt to separate a battery to perform power-off is conducted, the management server may detect that no information is received from the anti-theft application to determine that the battery separation is illegally made and determine that the theft attempt is made, and transmit the out-of-range information of the smart device to the administrator terminal.

If there is an attempt to terminate or delete the theft management application, the theft management application may be changed to an administrator authentication mode and thus may be set so as to prevent an execution of the termination or the deletion if the authentication is not successful, and if the authentication fails, the theft management application may transmit authentication failure information to the management server, and if receiving the authentication failure information, the anti-theft manager may transmit the authentication failure information to the administrator terminal to notify the theft attempt.

As described above, the anti-theft apparatus for a smart device according to the present invention can perform the theft and loss management of the smart device without a separate physical lock device such as a lock, such that the theft and loss management may be made without the user feeling uncomfortable or displeasing.

In addition, since a plurality of exhibition areas may be integrally managed, it is possible to greatly improve the efficiency of the theft and loss management of the smart device.

BRIEF DESCRIPTION OF DRAWINGS

FIGS. 1A and 1B are schematic views illustrating a configuration of an anti-theft apparatus for a smart device according to a preferred embodiment of the present invention.

DETAILED DESCRIPTION

Hereinafter, specific embodiments of the present invention will be described in detail with reference to the accompanying drawings.

Figure 1B:
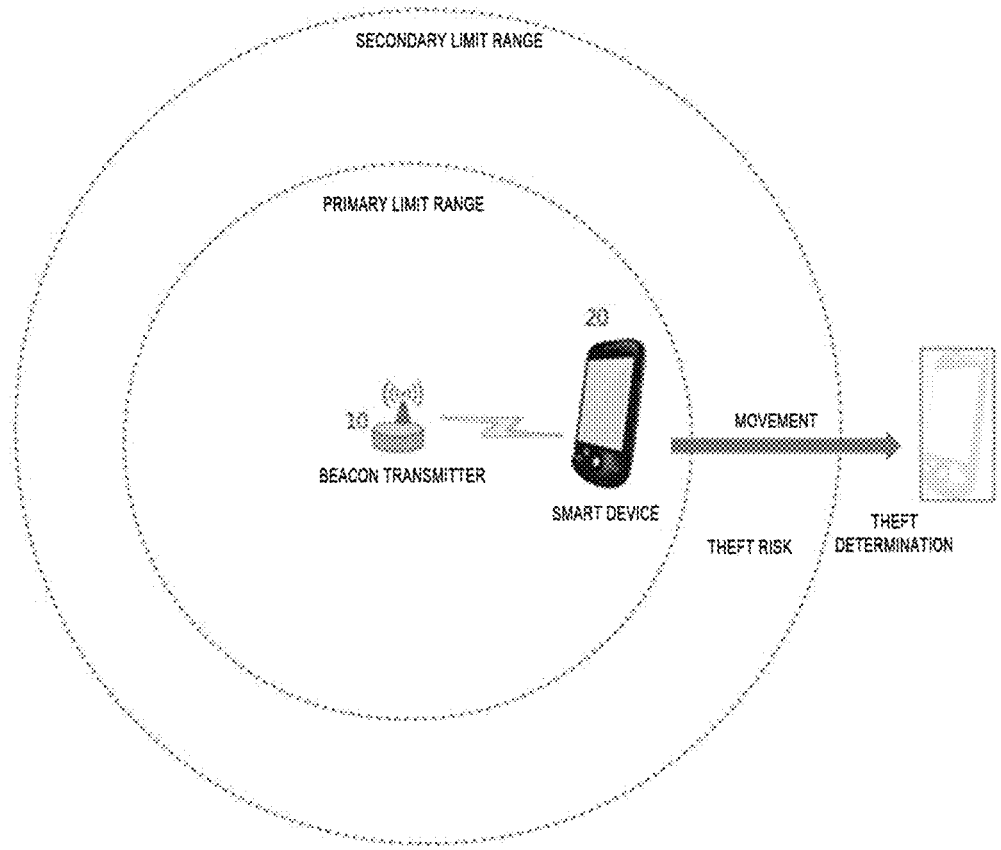
Figure 2:
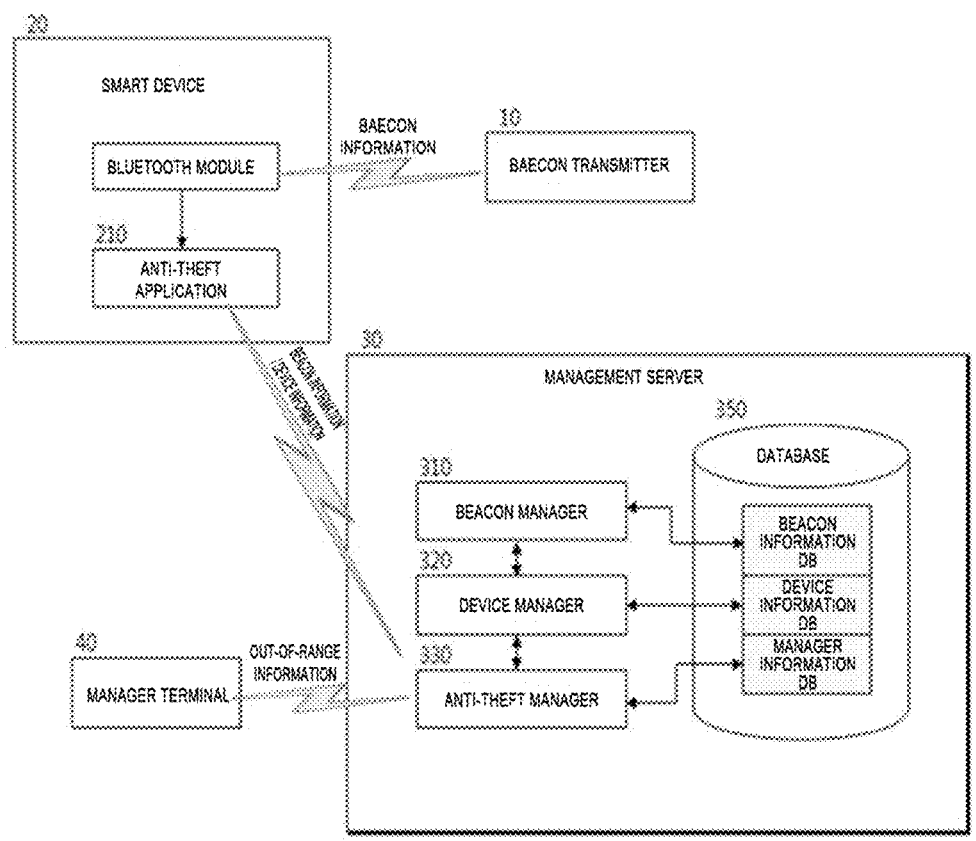
FIG. 2 is a detailed block diagram of FIGS. 1A and 1B.

FIGS. 1A and 1B are schematic views illustrating a configuration of an anti-theft apparatus for a smart device according to a preferred embodiment of the present invention, and FIG. 2 is a detailed block diagram of FIGS. 1A and 1B.

Referring to FIGS. 1A, 1B, and FIG. 2, the anti-theft apparatus for a smart device may include a beacon transmitter 10 that transmits beacon information to the smart device, a smart device 20 including a theft management application which is synchronized with the beacon transmitter and is configured to receive the beacon information and transmit the received beacon information to a management server, and a management server 30 that analyzes the beacon information and device information received from the theft management application to perform a theft management function.

The beacon transmitter 10 may be independently installed in stores in a detachable manner and plays a role of transmitting the beacon information to smart devices within coverage.

Herein, the beacon refers to a device that periodically transmits information in order to provide certain information to devices within the coverage, and refers to a method of transmitting information through Bluetooth which is near field communication.

In particular, Bluetooth beacon which is a near field communication technology using Bluetooth low energy (BLE) is a technology that provides various application services such as indoor positioning as well as an object and situation recognition based on proximity positioning.

The beacon transmitter 10 is a Bluetooth type but does not require separate pairing, and may periodically transmit its own identification information (ID) and an RSSI value as beacon information to devices within the coverage, so long as Bluetooth is turned on, without executing an authentication application. Herein, the beacon information may be configured to transmit only the identification information (ID) of the beacon transmitter without the RSSI value.

If the beacon transmitter 10 is installed in a specific space, the installation position information and the beacon information are stored and managed in a database of the management server, such that the beacon transmitter may be integrally managed.

In addition, the smart device 20 is installed or displayed in a specific space such as a shop or a show room and therefore is a device that is an anti-theft management target, and refers to a portable device in which a Bluetooth module using near field communication are equipped, in which the portable device may be smart wearing devices such as a smart phone, a mobile phone, a tablet PC, a smart watch, and a smart band.

The theft management application 210 may be installed in a device that is an anti-theft management target in an app type, and plays a role of transmitting the device information of the smart device and the beacon information received from the beacon transmitter to the management server 30, after installing in the smart device.

Herein, the device information may be unique information for identifying the smart device. In a case of a mobile phone, the device information may be a telephone number and in a case of other portable devices, the device information may be a serial number of the devices or an identification code (ID) newly assigned to the devices.

Herein, the newly assigned code may be a unique identification code (ID) assigned during the theft management application is installed, or a UUID generated during the theft management application is installed.

In case of a device using network communication or near field communication, it may be Mac address which is unique information. (ex, Wi-fi Mac address, Bluetooth Mac address).

In addition, when a limit range is arbitrarily set in the smart device 20, the device information may further include limit range information.

When the anti-theft application 210 is installed in the smart device 20, the management server 30 may receive the device information, and register the device information in the database to manage the same.

The management server 30 may include a beacon manager 310 that manages the beacon transmitter installed in a specific space, a device manager 320 that manages an anti-theft application installed in the smart device, an anti-theft manager 330 that compares the beacon information and the device information received through the anti-theft application with information pre-stored in the database to identify the corresponding smart device, and determines whether the corresponding smart device is positioned in a set limit range to perform the theft management function, and a database 350 that stores and manages the beacon information of the installed beacon transmitter, the device information of the smart device in which the anti-theft application is installed, and administrator information.

Herein, the limit range refers to a limit distance between the installed beacon transmitter and the installed or displayed smart device, and the coverage of the beacon transmitter may be set to be the limit range, but the limit range may be set by directly setting the limit distance within the coverage. At this time, if the smart device is out of the limit distance, it is determined that the smart device is highly likely to be stolen.

If the specific space is wide, the limit distance may be set to be wide, whereas if the specific space is narrow, the limiting distance may be set to be narrow.

If it is determined that the smart device is out of the limit range to be stolen, the anti-theft manager transmits an alarm signal to the smart device, and transmits out-of-range information of the smart device to an administrator terminal.

The limit range may be double-set, and a range in which the smart phone is likely to be stolen by being separated from the beacon transmitter with a predetermined distance may be set to be a primary limit range, and a range in which the smart phone is determined as being stolen by being separated far away from the beacon transmitter may be set to be a secondary limit range. For example, the primary limit range may be set to be 2 m and the secondary limit range may be set to be 5 m.

Herein, the anti-theft manager 330 may transmit an alarm signal to the smart device if the smart device is out of the primary limit range to operate an alarm of the smart device so as to arouse awareness about the theft to a holder, thereby guiding the holder to move in the primary limit range, and the an i-theft manger 330 may transmit the out-of-range information of the smart device to a pre-registered administrator terminal together with the alarm signal to the smart device if the smart device is out of the secondary limit range to guide an administrator to take a measure to prevent the theft.

The relative distance between the beacon transmitter 10 and the smart device 20 may be measured based on the RSSI value of the beacon information and the position information (GPS) of the smart device, thereby measuring the distance between the beacon transmitter and the smart device through the measured relative distance.

Further, the distance and the directivity may be calculated depending on the signal intensity of the received beacon information to measure the relative distance between the beacon transmitter and the smart device.

On the other hand, a plurality of beacon transmitters may be installed to perform the theft management function.

Figure 3:
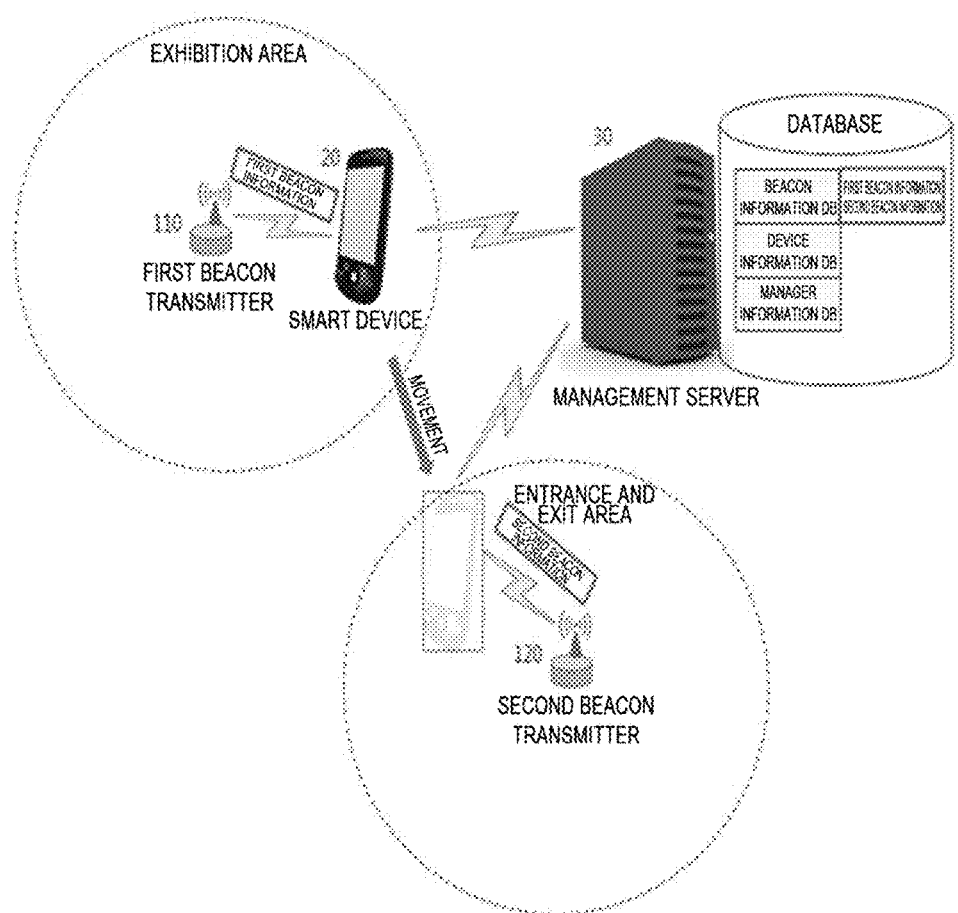
FIG. 3 is a schematic view illustrating a configuration of an anti-theft apparatus for a smart device according to another embodiment of the present invention.

FIG. 3 is a schematic view illustrating a configuration of an anti-theft apparatus for a smart device according to another embodiment of the present invention.

Referring to FIG. 3, there are two beacon transmitters including a first beacon transmitter 110 installed in an area where the smart device 20 is installed or displayed, and a second beacon transmitter 120 installed in an entrance and exit area for entering and exiting to an outside.

In this case, the database 350 of the management server may register in advance the first beacon information of the first beacon transmitter and the second beacon information of the second beacon transmitter to manage the same, and analyze the beacon information and the device information received from the anti-theft application of the smart device to grasp where the smart device is positioned.

More specifically, if the beacon information received from the smart device 20 is the information of the first beacon transmitter 110, the smart device 20 is positioned within the coverage of the first beacon transmitter and therefore may be determined to be in the safe state against the theft.

However, if the beacon information is not received from the smart device 20, it may be determined that the smart device 20 moves beyond the coverage of the first beacon transmitter, and if the beacon information of the second beacon transmitter 120 is received from the smart device, it may be determined that the smart device 20 moves to the vicinity of an entrance door and therefore is very highly likely to be stolen.

Accordingly, if the beacon information of the second beacon transmitter 120 is received from the smart device, it is determined that the smart phone is stolen and thus the alarm signal is transmitted to the smart device, and the out-of-range information may be transmitted to the administrator terminal 40.

Then, the anti-theft manager 330 may detect an abnormal power-off or an attempt to delete the theft management application to perform the theft management.

More specifically, if a user using the smart device 20 powers-off the smart device for the purpose of the theft, the anti-theft apparatus may be disabled. Therefore, it is possible to detect if there is an abnormal power-off attempt and transmit and notify the detection to the administrator terminal.

When the user clicks a power-off button to perform power-off, the management server may be set to block the power-off function in a state in which the anti-theft application is executed. When an attempt to separate a battery to perform power-off is conducted, the management server may detect that no information is received from the anti-theft application to determine that the battery separation is illegally made, and determine that anyone attempts the theft.

In addition, if there is an attempt to forcibly terminate or delete the theft management application 210, it is possible to set to be changed to an administrator authentication mode, so as to prevent an execution of the termination or the deletion if the authentication is not successful. This makes it possible to reliably prevent the theft attempt due to terminating or deleting the application.

Herein, the authentication may be performed by receiving authentication means such as a password and pattern which is set by an administrator, and determining whether the authentication means is matched.

If the authentication fails, the theft management application 210 may transmit the authentication failure information to the management server 30, and if receiving the authentication failure information, the anti-theft manager 330 of the management server may transmit the authentication failure information to the administrator terminal to notify the theft attempt.

Hereinafter, a specific anti-theft method for a smart device of the present invention will be described.

Figure 4:
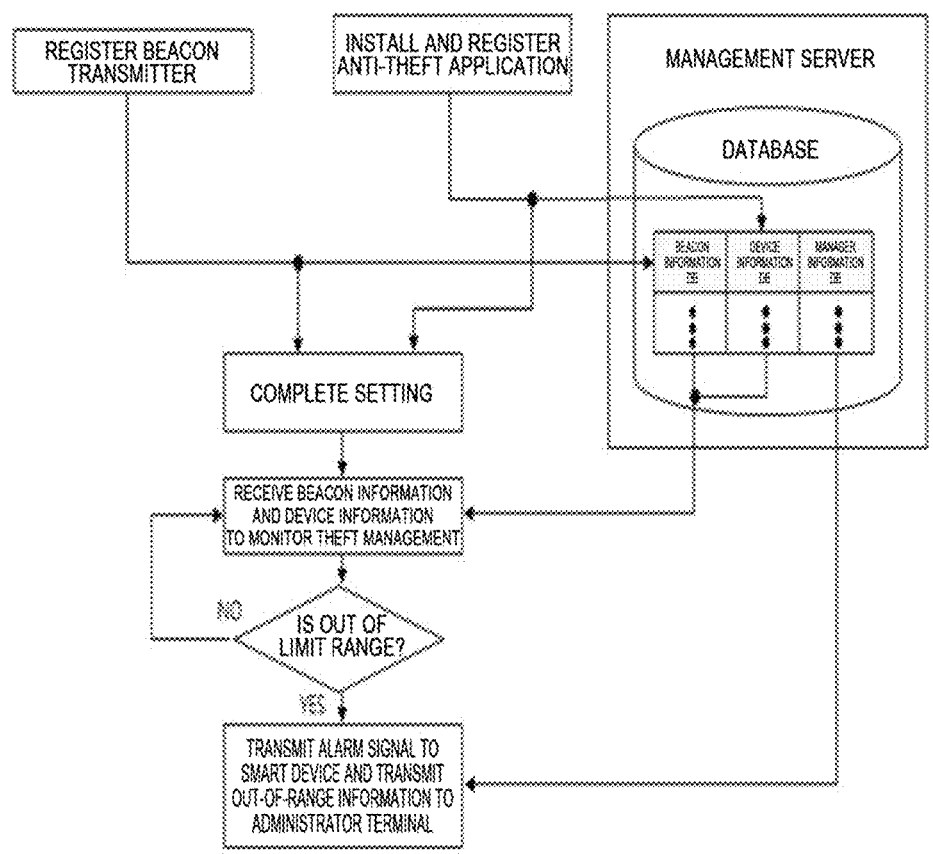
FIG. 4 is a flowchart schematically illustrating an anti-theft method for a smart device according to a preferred embodiment of the present invention.

FIG. 4 is a flowchart schematically illustrating an anti-theft method for a smart device according to a preferred embodiment of the present invention.

Referring to FIG. 4, first, a beacon transmitter is installed in a specific space, an anti-theft application is installed in a smart device that is the anti-theft management target to synchronize the beacon transmitter and the smart device with each other.

The beacon transmitter may be installed in an area in which the smart device is installed or displayed. When the beacon transmitter is installed, the beacon manager of the management server registers the installed beacon transmitter, and stores the beacon information of the beacon transmitter in the database.

Herein, the beacon information may include identification information (ID) of the beacon transmitter and optionally an RSSI value.

If the beacon transmitter is installed, the beacon manager may store the beacon information and accurate position information that is installed by mapping to the beacon information in the database and register the same. This makes it possible to specify and identify the accurate position of the beacon transmitter after the beacon transmitter is registered.

When the anti-theft application is installed in the smart device, the device manager of the management server receives device information of the smart device through the anti-theft application and registers the same in the database.

Herein, the device information may be identification information capable of identifying a smart device. In case of the mobile phone, the device information may include a telephone number, a serial number of devices, or a newly assigned identification code (ID).

When the device information is registered in the database as described above, the device information matching the device information received from the smart device may be extracted to identify the smart device.

In addition, the beacon transmitter and the smart device may be synchronized with each other to block the beacon information of the beacon transmitter from being received by smart devices other than the smart device that is the anti-theft management target.

The synchronization between the beacon transmitter and the smart device may be performed by the theft management application installed in the smart device by receiving the beacon information of the beacon transmitter from the management server.

As described above, when the setting of the beacon transmitter and the theft management application of the smart device completed, the beacon transmitter periodically transmits the beacon information, and the anti-theft application of the smart device receives the beacon information and transmits the beacon information to the management server together with the device information, and the management server analyzes the received beacon information and the device information to perform the theft management.

The theft manager compares the pre-registered beacon information and the device information with the received beacon information and device information to identify the beacon transmitter and the smart device.

Herein, the limit range for the theft determination may be set, wherein the limit range may be set to be the coverage of the beacon transmitter, and to be the limit distance which is arbitrarily set within the coverage of the beacon transmitter.

First, if the coverage of the beacon transmitter is within the limit range, when the beacon information of the beacon transmitter is received, it may be determined that the smart device is within the limit range, and when the beacon information is not received, it may be determined that the smart device is out of the limit range. Accordingly, in this case, the anti-theft manager of the management server may determine whether there is a risk of theft based on the presence or absence of the beacon signal.

If the limit distance is arbitrarily set, the anti-theft manager measures the relative distance between the beacon transmitter and the smart device, and it may be determined that the smart device is out of the limit range when the relative distance is out of the limit distance range.

For example, if the limit distance is set to be 2 m and the calculated relative distance between the beacon transmitter and the smart device is set to be 3 m, it is determined that the smart device is out of the limit range.

Herein, the relative distance between the beacon transmitter and the smart device may be measured based on the SSI value of the beacon information and the position information (GPS) of the smart device.

If it is determined that the smart device is out of the limit range as described above, the anti-theft manager sends an alarm generation command to the anti-theft application, and the anti-theft application receiving the alarm generation command transmits the warning sound to the smart device.

At the same time, an out-of-range message notifying that the identified smart device is highly likely to be stolen is transmitted to the registered administrator terminal, thereby notifying the manager of the theft risk.

Meanwhile, when the smart device includes two beacon transmitters including the first beacon transmitter installed in the area where the smart device is installed or displayed and the second beacon transmitter installed in the entrance and exit area for entering and exiting to the outside, the database of the management server may register in advance the first beacon information of the first beacon transmitter and the second beacon information of the second beacon transmitter to manage the same, and analyze the beacon information and the device information received from the anti-theft application of the smart device to grasp where the smart device is positioned.

More specifically, if the beacon information received from the smart device is information of the first beacon transmitter, it may be determined that the smart device is positioned within the coverage of the first beacon transmitter and therefore is in the safe state against the theft.

However, if the beacon information is not received from the smart device, it may be determined that the smart device moves beyond the coverage of the first beacon transmitter, and if the beacon information of the second beacon transmitter is received from the smart device, it may be determined that the smart device moves to the vicinity of the entrance door and therefore is very highly likely to be stolen.

Accordingly, if the beacon information of the second beacon transmitter is received from the smart device, it is determined that the smart phone is stolen and thus the alarm signal is transmitted to the smart device, and the out-of-range information may be transmitted to the administrator terminal.

While the preferred embodiments of the invention described above are described in the detailed description of the present invention, the protective scope of the invention not limited to the disclosed embodiments. Therefore, it is to be understood by those skilled in the art that the present invention may be variously modified and changed without departing from the spirit and scope of the invention.

The invention claimed is:

1. An anti-theft apparatus for a smart device, comprising:
a beacon transmitter configured to transmit beacon information to the smart device;
the smart device including a theft management application which is synchronized with the beacon transmitter and is configured to receive the beacon information and transmit the received beacon information to a management server together with device information; and
the management server configured to analyze the beacon information and the device information received from the theft management application to perform a theft management function,
wherein the beacon information includes identification information (ID) of the beacon transmitter and optionally an a Received Signal Strength Indication (RSSI) value;
the device information is unique information for identifying the smart device, and in a case of a mobile phone, the device information is a telephone number and in a case of other portable devices, the device information is any one selected from a serial number of the devices, a Mac address, or an identification code (ID) newly assigned to the devices;
the management server includes:
a beacon manager configured to register and manage a beacon transmitter installed in a specific space;
an application manager configured to register and manage an anti-theft application installed in the smart device;
an anti-theft manager configured to compare the beacon information and the device information received through the anti-theft application with information pre-stored in a database to identify the corresponding beacon transmitter and the smart device, and determine whether the corresponding smart device is positioned in a limit range to perform the theft management function; and
the database configured to store and manage the beacon information of the installed beacon transmitter, the device information of the smart device in which the anti-theft application is installed, and administrator information;
the beacon transmitter includes a first beacon transmitter installed in an area where the smart device is installed or displayed, and at least one second beacon transmitter installed in an entrance and exit area for entering and exiting to an outside; and
wherein the beacon transmitter includes a first beacon transmitter installed in an area where the smart device is installed or displayed, and at least one second beacon transmitter installed in an entrance and exit area for entering and exiting to an outside, and the anti-theft manager determines that the smart device is positioned within coverage of the first beacon transmitter and therefore is in a safe state against a theft if the beacon information received from the smart device is information of the first beacon transmitter, determines that the smart device moves beyond the coverage of the first beacon transmitter if the beacon information is not received from the smart device, and determines that the smart device moves to the vicinity of an entrance door and therefore is highly likely to be stolen if the beacon information of the second beacon transmitter is received from the smart device.

2. An anti-theft apparatus for a smart device, comprising:
a beacon transmitter configured to transmit beacon information to the smart device;
the smart device including a theft management application which is synchronized with the beacon transmitter and is configured to receive the beacon information and transmit the received beacon information to a management server together with device information; and
the management server configured to analyze the beacon information and the device information received from the theft management application to perform a theft management function,
wherein the beacon information includes identification information (ID) of the beacon transmitter and optionally an a Received Signal Strength Indication (RSSI) value;
the device information is unique information for identifying the smart device, and in a case of a mobile phone, the device information is a telephone number and in a case of other portable devices, the device information is any one selected from a serial number of the devices, a Mac address, or an identification code (ID) newly assigned to the devices;
the management server includes:
a beacon manager configured to register and manage a beacon transmitter installed in a specific space;
an application manager configured to register and manage an anti-theft application installed in the smart device;
an anti-theft manager configured to compare the beacon information and the device information received through the anti-theft application with information pre-stored in a database to identify the corresponding beacon transmitter and the smart device, and determine whether the corresponding smart device is positioned in a limit range to perform the theft management function; and
the database configured to store and manage the beacon information of the installed beacon transmitter, the device information of the smart device in which the anti-theft application is installed, and administrator information;
wherein the limit range is set to be the coverage of the beacon transmitter or is arbitrarily set based on a relative distance between the beacon transmitter and the smart device within the coverage of the beacon transmitter, and
the antitheft manager transmits an alarm signal to the smart device if it is determined that the smart device is out of the limit range to be stolen, and transmits out-of-range information of the smart device to an administrator terminal.

3. The anti-theft apparatus of claim 2, wherein if the limit range is arbitrarily set, the anti-theft manager measures the relative distance based on the RSSI value of the beacon information and position information (GPS) of the smart device.

4. The anti-theft apparatus of claim 3, wherein the limit range is double-set by setting a range in which the smart phone is likely to be stolen by being separated from the beacon transmitter with a predetermined distance to be a primary limit range, and setting a range in which the smart phone is determined as being stolen by being separated far away from the beacon transmitter to be a secondary limit range, and an alarm signal is transmitted to the smart device if the smart device is out of the primary limit range to operate an alarm of the smart device so as to arouse awareness about the theft to a holder, thereby guiding the holder to move in the primary limit range, and the out-of-range information of the smart device is transmitted to a pre-registered administrator terminal together with the alarm signal to the smart device if the smart device is out of the secondary limit range to guide an administrator to take a measure to prevent the theft.

5. The anti-theft apparatus of claim 2, wherein the anti-theft manager detects an abnormal power-off or an attempt to terminate or delete the theft management application to perform theft management.

6. The anti-theft apparatus of claim 5, wherein if there is an abnormal power-off attempt, the theft management application is set to block a power-off function in a state in which the anti-theft application is executed when a power-off button is clicked, and when an attempt to separate a battery to perform power-off is conducted, the management server detects that no information is received from the anti-theft application to determine that the battery separation is illegally made and determine that the theft attempt is made, and transmits the out-of-range information of the smart device to the administrator terminal.

7. The anti-theft apparatus of claim 5, wherein if there is an attempt to terminate or delete the theft management application, the theft management application is changed to an administrator authentication mode and thus is set so as to prevent an execution of the termination or the deletion if the authentication is not successful, and if the authentication fails, the theft management application transmits authentication failure information to the management server, and if receiving the authentication failure information, the anti-theft manager transmits the authentication failure information to the administrator terminal to notify the theft attempt.

* * * * *